(12) United States Patent
Vasseur et al.

(10) Patent No.: US 9,979,619 B2
(45) Date of Patent: May 22, 2018

(54) IDENTIFYING A SOURCE OF PACKET DROPS IN A NETWORK

(71) Applicant: Cisco Technology, Inc., San Jose, CA (US)

(72) Inventors: Jean-Philippe Vasseur, Anchorage, AK (US); Pascal Thubert, La Colle sur Loup (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 14/950,042

(22) Filed: Nov. 24, 2015

(65) Prior Publication Data

US 2017/0149639 A1 May 25, 2017

(51) Int. Cl.
*H04L 12/18* (2006.01)
*H04L 12/26* (2006.01)
(Continued)

(52) U.S. Cl.
CPC ...... *H04L 43/0835* (2013.01); *H04L 12/1868* (2013.01); *H04L 12/44* (2013.01);
(Continued)

(58) Field of Classification Search
CPC ................ H04L 12/1868; H04L 12/44; H04L 2012/561; H04L 2012/644; H04L 41/06; H04L 41/0618; H04L 41/0636; H04L 41/142; H04L 43/0825; H04L 43/0835; H04L 43/0894; H04L 45/123; H04L 45/48; H04L 45/70; H04L 67/12
See application file for complete search history.

(56) References Cited

U.S. PATENT DOCUMENTS

| | | | | |
|---|---|---|---|---|
| 5,720,003 A | * | 2/1998 | Chiang | ................ G06N 99/005 706/10 |
| 6,791,954 B1 | * | 9/2004 | Cheng | ................. H04W 52/125 370/311 |

(Continued)

OTHER PUBLICATIONS

Vasseur et al., "Routing Metrics Used for Path Calculation in Low-Power and Lossy Networks", Request for Comments 6551, Mar. 2012, 30 pages, Internet Engineering Task Force Trust.

(Continued)

*Primary Examiner* — Alpus H Hsu
(74) *Attorney, Agent, or Firm* — Parker Ibrahim & Berg LLP; James M. Behmke; Stephen D. LeBarron

(57) ABSTRACT

In one embodiment, a device in a network performs a first comparison between observed and expected packet error rates for a first path in the network. The device identifies one or more intersecting paths in the network that intersect the first path. The device performs one or more additional comparisons between observed and expected packet error rates for the intersecting paths that intersect the first path. The device identifies a particular node along the first path as a source of packet drops based on the first comparison between the observed and expected packet error rates for the first path and on the one or more additional comparisons between the observed and expected packet error rates for the intersecting paths that intersect the first path.

20 Claims, 16 Drawing Sheets

(51) Int. Cl.
*H04L 12/44* (2006.01)
*H04L 12/751* (2013.01)
*H04L 29/08* (2006.01)
*H04L 12/24* (2006.01)
*H04L 12/721* (2013.01)

(52) U.S. Cl.
CPC ........ *H04L 41/0677* (2013.01); *H04L 41/142* (2013.01); *H04L 45/70* (2013.01); *H04L 67/12* (2013.01)

(56) References Cited

U.S. PATENT DOCUMENTS

| | | | |
|---|---|---|---|
| 7,145,876 B2 * | 12/2006 | Huang | H04L 1/0007 370/230 |
| 7,293,142 B1 | 11/2007 | Xu et al. | |
| 7,573,820 B2 * | 8/2009 | Krishnaswamy | H04W 72/1242 370/230 |
| 7,688,858 B2 * | 3/2010 | Mane | H04L 12/56 370/389 |
| 7,720,000 B2 * | 5/2010 | Yoshida | H04L 43/0847 370/252 |
| 7,770,055 B2 | 8/2010 | Khurana et al. | |
| 8,194,655 B2 * | 6/2012 | Pister | H04L 45/02 370/310.2 |
| 8,335,166 B2 | 12/2012 | Xu et al. | |
| 8,396,012 B2 * | 3/2013 | Daraiseh | H04L 45/121 370/255 |
| 8,630,291 B2 * | 1/2014 | Shaffer | H04L 45/22 370/390 |
| 8,923,136 B2 * | 12/2014 | Simonsson | H04W 72/085 370/242 |
| 9,185,587 B2 * | 11/2015 | Vangala | H04W 24/06 |
| 9,276,845 B2 * | 3/2016 | Shaffer | H04L 45/22 |
| 9,369,351 B2 * | 6/2016 | Di Pietro | H04L 41/5025 |
| 9,634,919 B2 * | 4/2017 | Martinsen | H04L 43/062 |
| 2012/0216076 A1 | 8/2012 | MacIk et al. | |
| 2014/0071817 A1 | 3/2014 | Chen | |

OTHER PUBLICATIONS

Thubert P., "Objective Function Zero for the Routing Protocol for Low-Power and Lossy Networks (RPL)", Request for Comments 6552, Mar. 2012, 14 pages, Internet Engineering Task Force Trust.
Gnawali et al., "The Minimum Rank with Hysteresis Objective Function", Request for Comments 6719, Sep. 2012, 13 pages, Internet Engineering Task Force Trust.

* cited by examiner

IDENTIFYING A SOURCE OF PACKET DROPS IN A NETWORK

TECHNICAL FIELD

The present disclosure relates generally to computer networks, and, more particularly, to identifying a source of packet drops in a network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Another potential challenge to next-generation networks are software defects. For example, an unintentional memory leak in the programming of an LLN device may eventually lead to packets being dropped in the network. Thus far, LLN routing protocols have relied on dynamically computed link metrics, such as expected transmission count (ETX) values, to account for link quality degradation. However, these approaches do not address packet drops caused by potential software defects present at the local devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
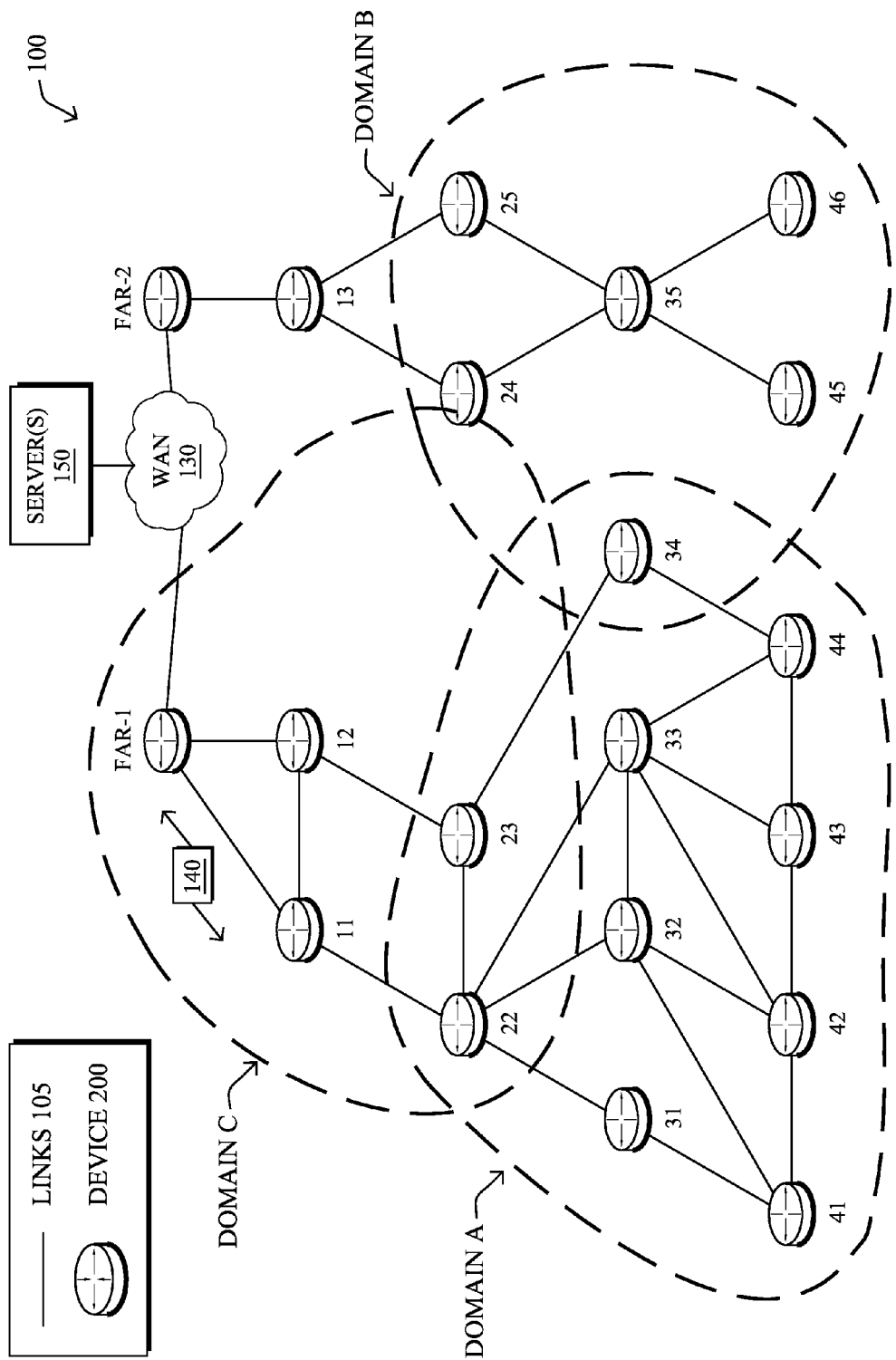
FIG. 1 illustrates an example communication network.

According to one or more embodiments of the disclosure, a device in a network performs a first comparison between observed and expected packet error rates for a first path in the network. The device identifies one or more intersecting paths in the network that intersect the first path. The device performs one or more additional comparisons between observed and expected packet error rates for the intersecting paths that intersect the first path. The device identifies a particular node along the first path as a source of packet drops based on the first comparison between the observed and expected packet error rates for the first path and on the one or more additional comparisons between the observed and expected packet error rates for the intersecting paths that intersect the first path.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

In some embodiments, network 100 may be configured as a deterministic network. Generally, deterministic networking refers to networks that can guaranty the delivery of packets within a bounded time. For example, industrial networking typically requires predictable communications between devices (e.g., to actuate a machine along an assembly line at a precise time, etc.). This translates into the following criteria: 1.) a high delivery ratio (e.g., a loss rate of 10-5 to 10-9, depending on the application), 2.) fixed latency, and 3.) jitter close to zero (e.g., on the order of microseconds).

A limited degree of control over the timing of network traffic can be achieved by using quality of service (QoS) tagging and/or performing traffic shaping/admission control. For time sensitive flows, though, latency and jitter can only be fully controlled by scheduling every transmission at every hop. In turn, the delivery ratio can be optimized by applying packet redundancy with all possible forms of diversity in terms of space, time, frequency, code (e.g., in CDMA), hardware (e.g., links, routers, etc.), software (implementations), etc. Most of the methods above apply to both Ethernet and wireless technologies. Mixed approaches may combine QoS technologies with scheduling (e.g., triggering emission of packets on the different QoS queues using a schedule-based gate mechanism).

Figure 2:
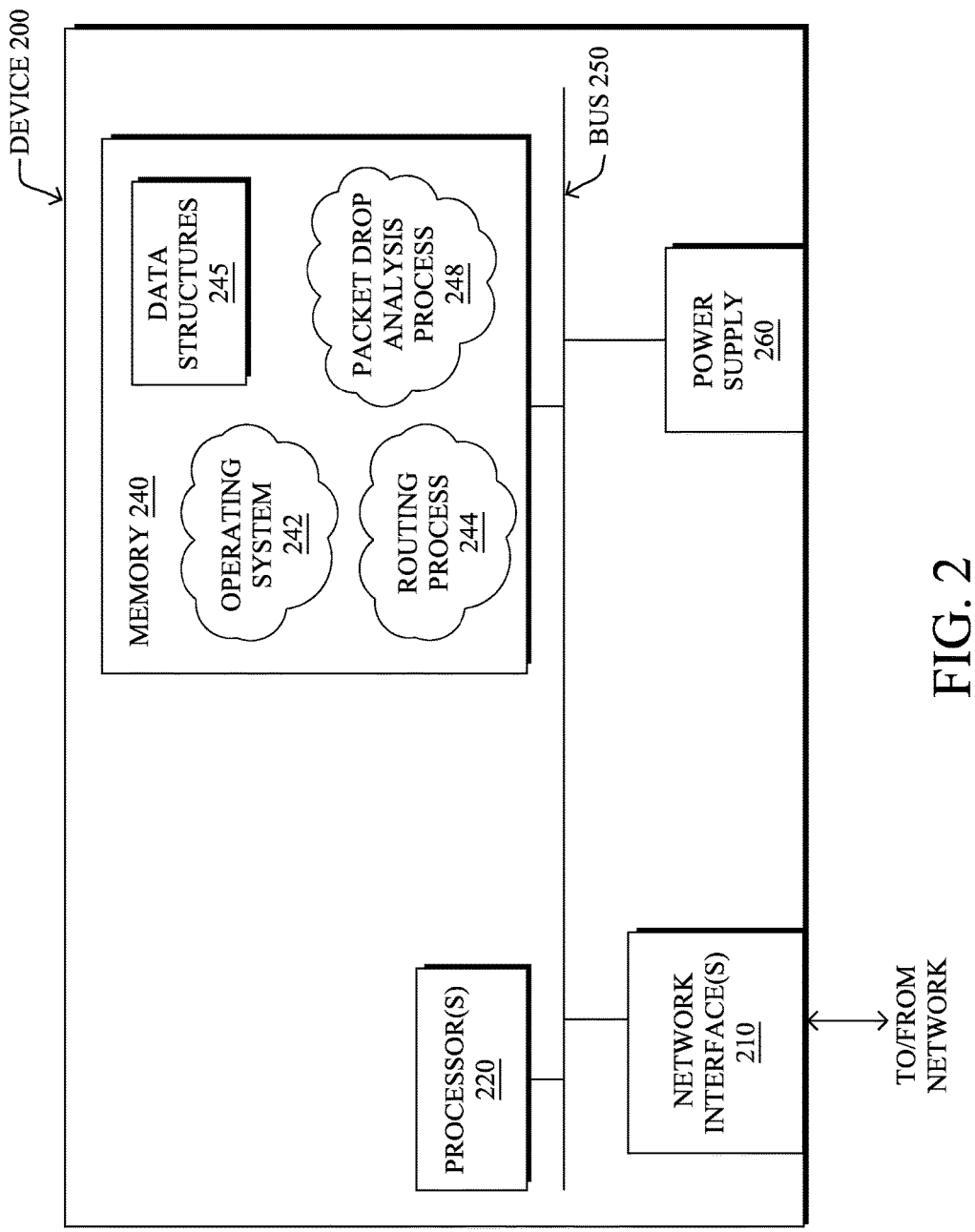
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative packet drop analysis process 248 as described in greater detail below. Note that while packet drop analysis process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

According to various embodiments, packet drop analysis process 248 may be configured to perform the operations described herein with respect to analyzing packet drops in a network and identifying a source of packet drops along a network path (e.g., a particular node). For example, packet drop analysis process 248 may be configured to compare expected and observed packet error rates for the intersecting paths, to identify the source of any discrepancies between the expected and observed packet error rates. In further embodiments, packet drop analysis process 248 may initiate the sending of packet trains in the network, to test different network paths and pinpoint a source of abnormal packet drops. In another embodiment, packet drop analysis process 248 may cause any number of corrective measures to be taken, in response to identifying a source of packet drops (e.g., causing a routing change to avoid the misbehaving node, etc.).

In some embodiments, packet drop analysis process 248 may use machine learning to identify a source of packet drops in the network. Generally, machine learning is concerned with the design and the development of processing techniques that take as input empirical data (e.g., network statistics and performance indicators) and recognize complex patterns in these data. These patterns can then be used to make decisions automatically (e.g., via close-loop control) or to help make decisions. Machine learning is a very broad discipline used to tackle very different problems (e.g., computer vision, robotics, data mining, search engines, etc.), but the most common tasks are as follows: linear and non-linear regression, classification, clustering, dimensionality reduction, anomaly detection, optimization, association rule learning.

One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$, with the associated cost function indicating the number of misclassified points. During operation, the machine learning process may adjust the parameters a, b, and c, to minimize the cost function and the number of misclassified points. After this optimization phase (or learning phase), the model M can be used to classify new data points. Often, M is a statistical model, and the cost function is inversely proportional to the likelihood of M, given the input data.

Learning machines are computational entities that rely on one or more machine learning techniques to perform a task for which they have not been explicitly programmed to perform. In particular, they are capable of adjusting their behavior to their environment. In some cases, packet drop analysis process 248 may be configured as a learning machine that uses any, or all, of the following machine learning techniques: artificial neural networks (ANN), support vector machines (SVM), naive Bayes, decision trees, and the like. In some cases, a learning network may even employ hierarchical classifiers (e.g., a hierarchy of ANNs), to ultimately classify data. Packet drop analysis process 248 may also employ the use of time series models such as autoregressive moving average models (ARMAs) or autoregressive integrated moving average models (ARIMAs).

For purposes of detecting abnormal packet drops in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Routing process (services) 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Deterministic networking is a fundamental component of the IoT, and is needed for time critical applications such as industrial automation, inflight control systems, internal vehicle networking, and the like. Most of these application fields are mission critical and require novel solution since up to recently they are manual controlled an operated, the emergence of dynamic system requiring the specification of the number of new solutions to address fast emerging requirements. Accordingly, in some embodiments, routing process 244 may be configured to support deterministic technologies such as Deterministic Ethernet or Deterministic Wireless. Generally, these technologies use time scheduling, to ensure that all nodes of a given path are synchronized. The Network Time Protocol (NTP) and Precision Time Protocol (PTP) are example protocols that may be used to synchronize the local timing mechanisms of the nodes. Forwarding of each packet is then regulated by the synchronized time schedule, which specifies when a given packet has to be transmitted. Generally, this time period is referred to as a time slot. In some implementations, an external agent (e.g., a PCE, etc.), sometimes referred to as a orchestrator, may be configured to compute the path and associated timetables for the path. The computed path and timetable are then downloaded onto every node along the path which, in turn, transmits packets along the path according to the computed time schedule.

An example routing protocol that may be used by routing process 244 for LLNs is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
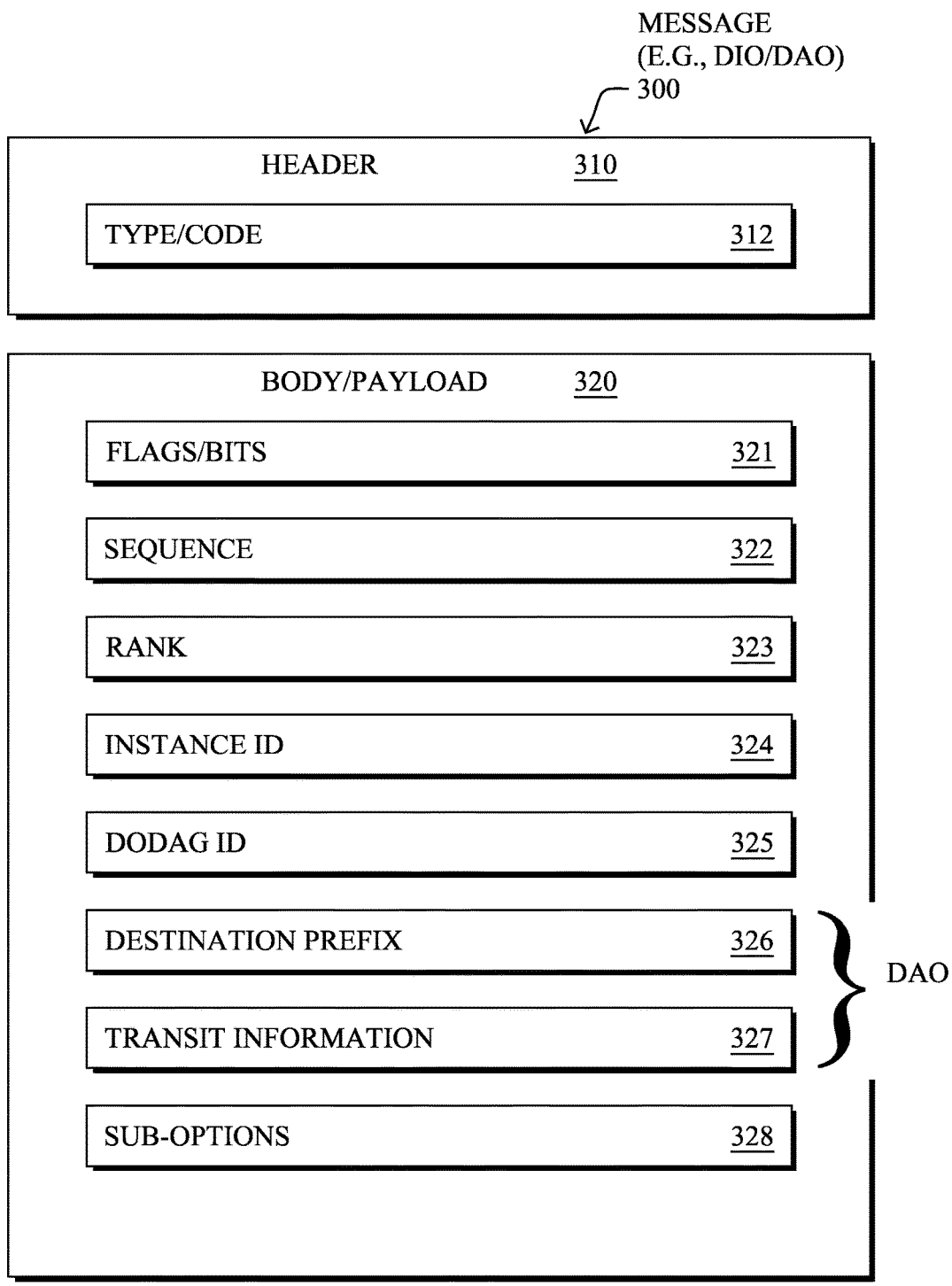
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
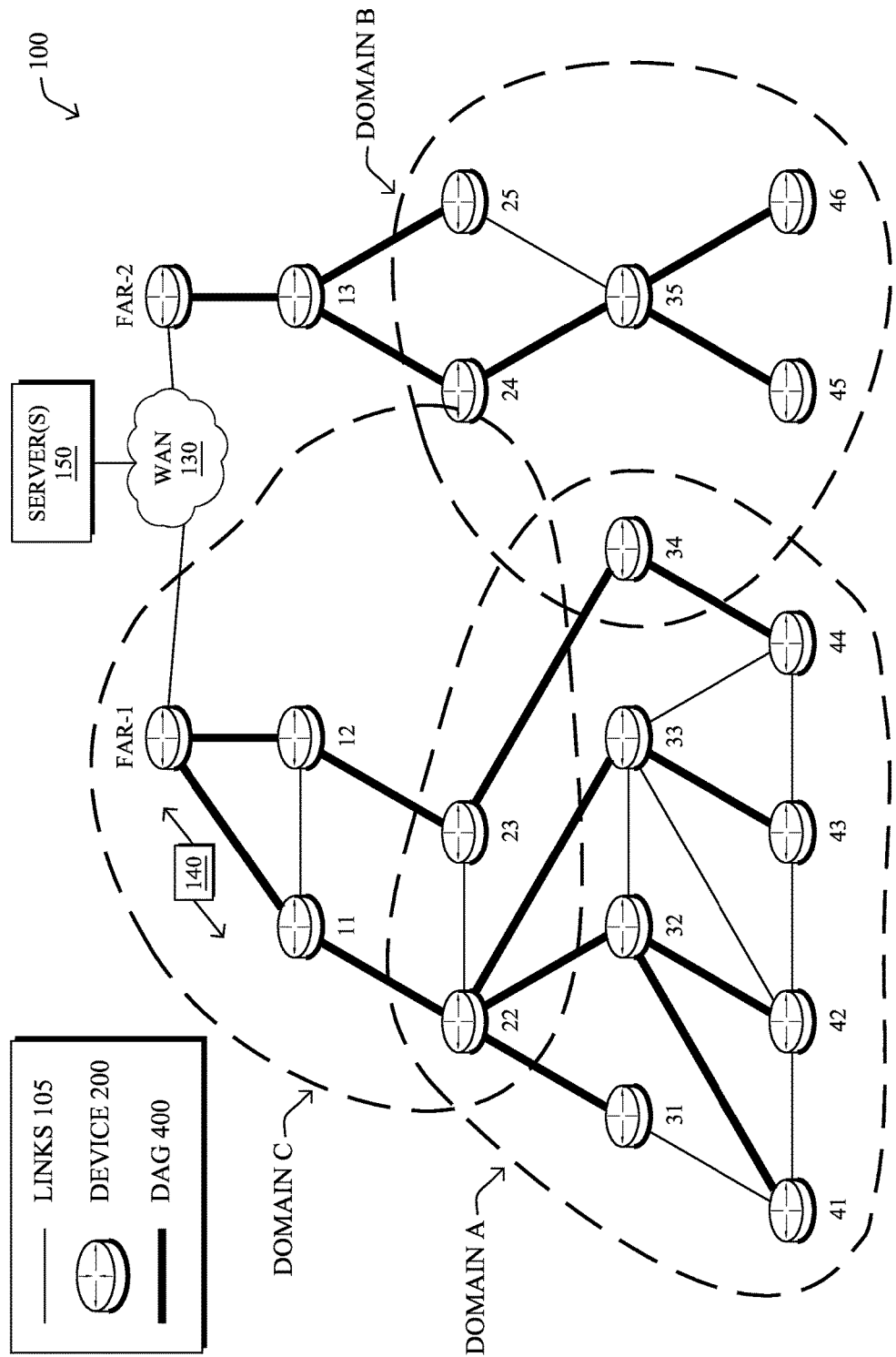
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1)

may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
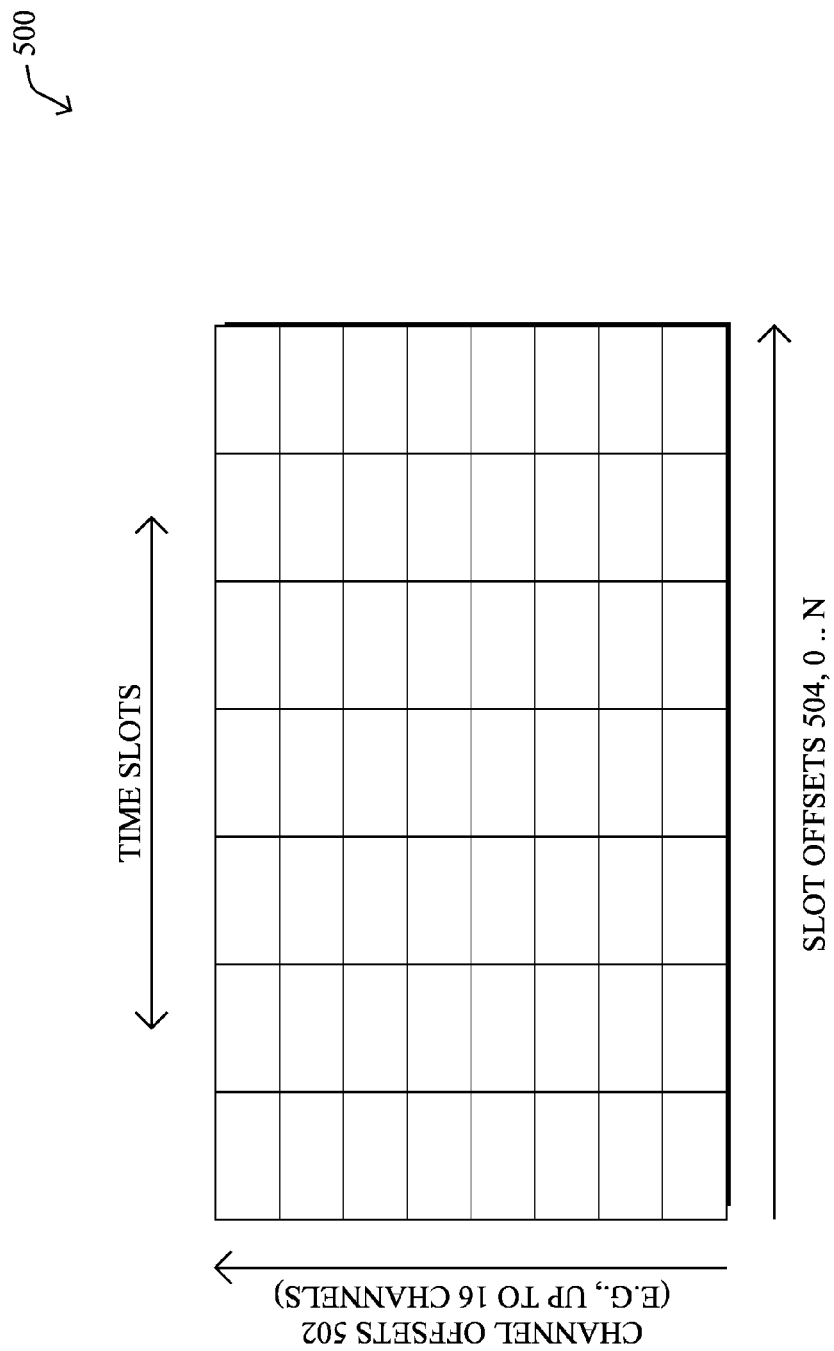
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
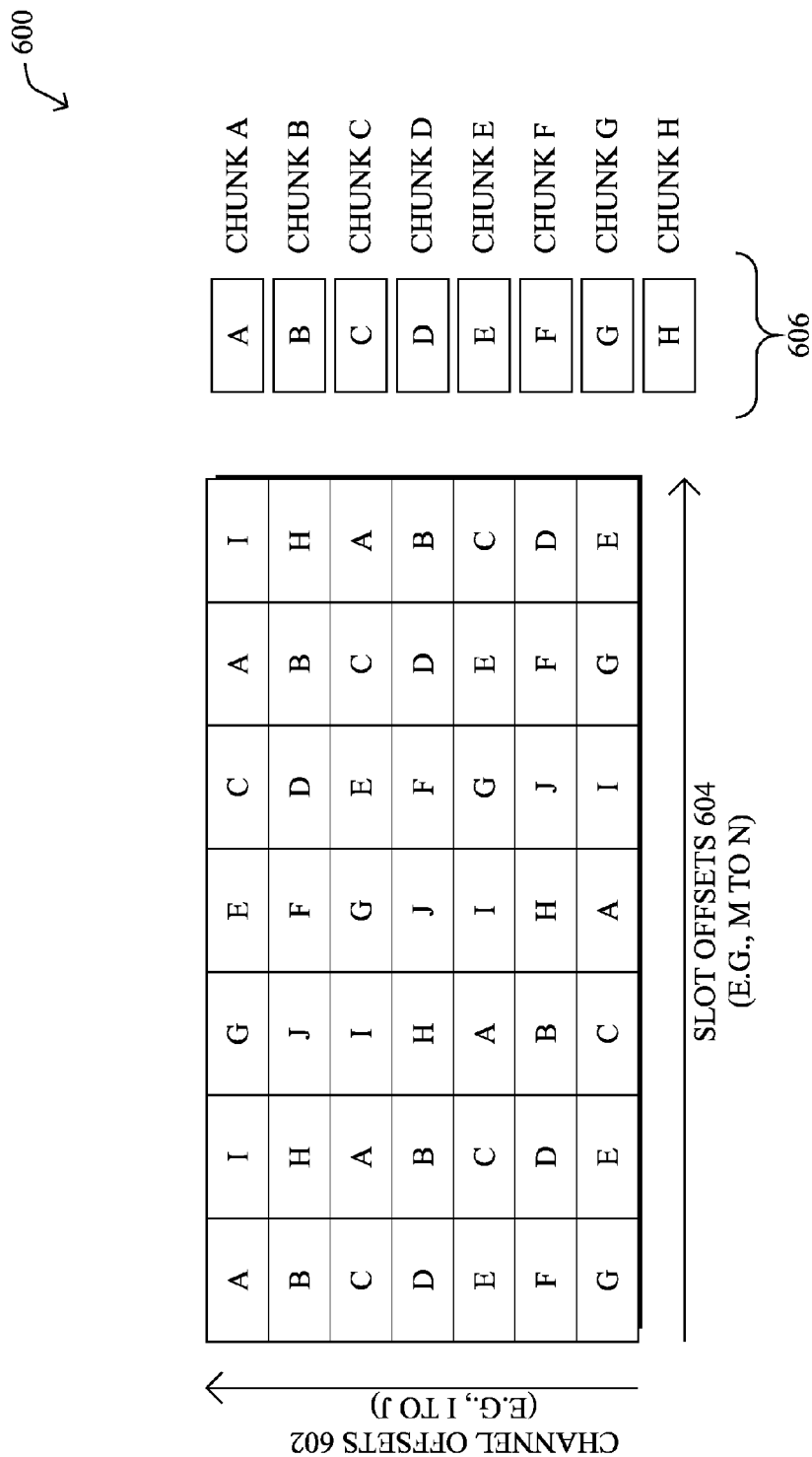
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
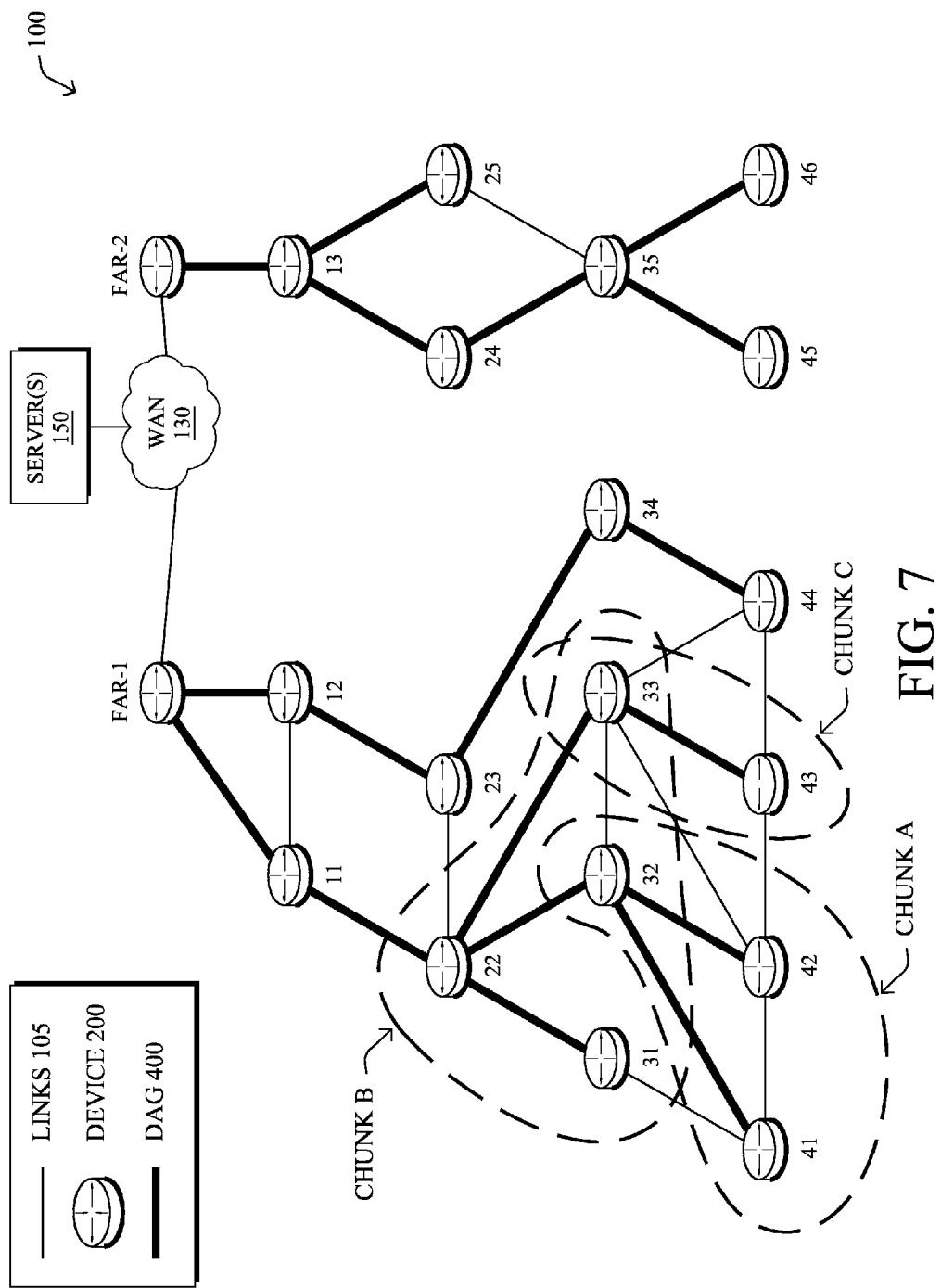
FIGS. 7-8 illustrate examples of a parent node in the network of FIG. 1 scheduling communications for a particular chunk.
Figure 8:
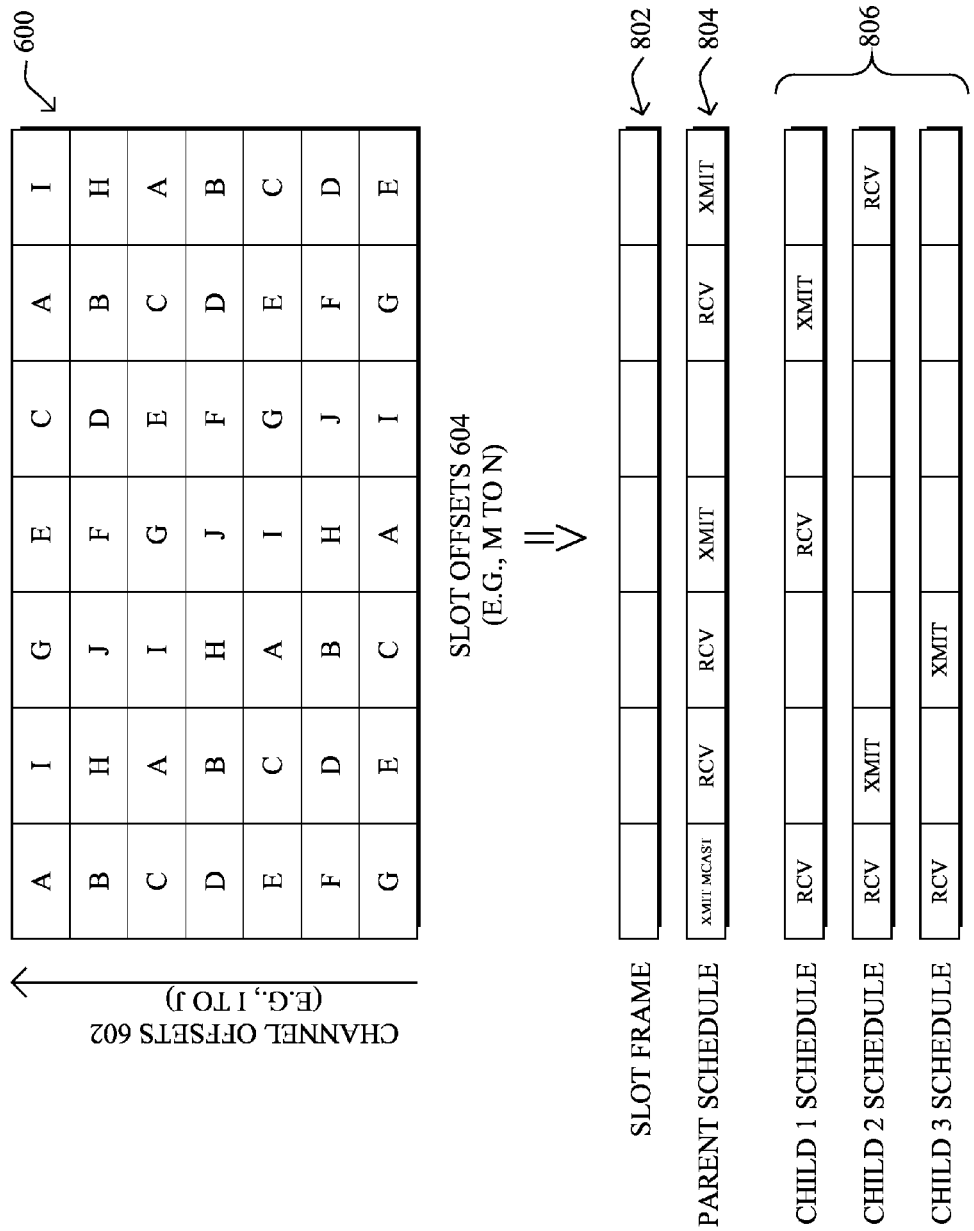

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/ traffic flows. The different slot frames may be implemented as having the same durations/sizes or different durations/ sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/ channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. In other words, a 6TiSCH track may represent a given path in a network, with the successive cells/time slots of the track representing the send and receive times of the nodes along the path. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6 top sublayer switches it without incurring a change in the MAC header. In the case of IEEE802.15.4e, this means effectively broadcast, so that along the track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6 top sublayer.

As noted above, routing protocol such as RPL may make use of dynamically computed link metrics (e.g., ETX metrics, etc.), to make routing decisions that accommodate link quality degradation (e.g., due to changing network conditions, movement of devices, etc.). However, such approaches also fail to account for situations in which a particular node itself is misbehaving due, e.g., to a software defect present at the node. In particular, if a node is misbehaving and causing packet drops, but does not actually fail, the routing protocol may not initiate a reroute.

Identifying a Source of Packet Drops in a Network

The techniques herein facilitate the detection of a node exhibiting a software defect by correlating network performance metrics with observed packet loss. In one aspect, the techniques herein may be used to gather network performance metrics related to packet error rates for one or more paths in the network. In another aspect, a network device may request the sending of packet trains, to assess the packet error rates of certain paths in the network. Such a request may also specify when the packet trains should be sent, the characteristics of the test packets, etc. In a further aspect, the techniques herein may be used to compute and identify a potential discrepancy between link and path packet error rates. For example, a network device may use machine learning to analyze packet error rates and identify outliers. In another aspect, the techniques herein facilitate taking corrective measures, should a source of packet drops be identified. For example, traffic may be rerouted to avoid the misbehaving node, new 6TiSCH tracks may be provisioned, etc., while still taking into account the tradeoff between increasing path reliability at the expense of also increasing the path cost.

Specifically, according to one or more embodiments of the disclosure as described in detail below, a device in a network performs a first comparison between observed and expected packet error rates for a first path in the network. The device identifies one or more intersecting paths in the network that intersect the first path. The device performs one or more additional comparisons between observed and expected packet error rates for the intersecting paths that intersect the first path. The device identifies a particular node along the first path as a source of packet drops based on the first comparison between the observed and expected packet error rates for the first path and on the one or more additional comparisons between the observed and expected packet error rates for the intersecting paths that intersect the first path.

Illustratively, the techniques described herein may be performed by hardware, software, and/or firmware, such as in accordance with the packet drop analysis process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a network device may accumulate network-based statistics, to detect discrepancies between packet loss for a network path and the packet loss experienced on each of its constituent links. FIGS. 9A-9D illustrate examples of a network device identifying a source of packet drops, according to various embodiments.

Figure 9A:
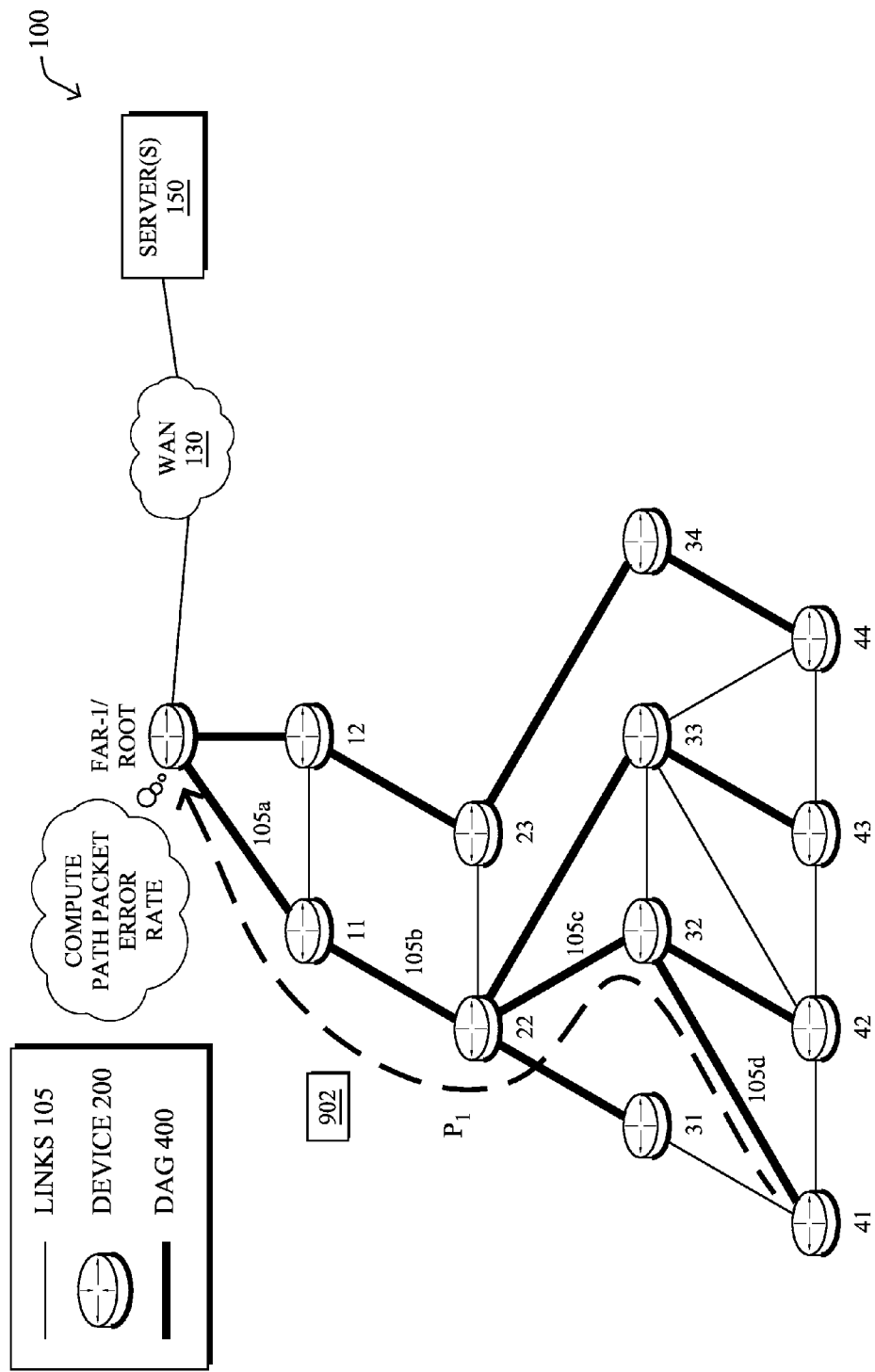
FIGS. 9A-9D illustrate examples of a network device identifying a source of packet drops.

As shown in FIG. 9A, assume that a first network path, P1, has been formed in network 100 between nodes 41, 32, 22, 11, and the Root node. Correspondingly, path P1 may comprise constituent links 105a-105d between these nodes. Thus, node 41 may send packets 902 to the Root node via path P1. In some embodiments, the Root node or another supervisory device (e.g., a PCE in servers 150, etc.) may compare the expected packet error rate for path P1 to the observed packet error rate for path P1, to determine whether any of the nodes alone path P1 is exhibiting anomalous packet drops due, e.g., to software defects on the misbehaving node.

Various techniques may be used to quantify the packet error rate for path P1. For example, the ETX for a given link can be computed as the inverse of the link throughput but also as the inverse of the product of probability of successful transmission of the packet and corresponding acknowledgement (ACK). Typically, a link ETX is computed using a low pass filter by each node and represents the average number of times a packet must be transmitted for a successful transmission between two nodes. In turn, the link ETX metrics can be used to calculate the overall path ETX for the path. For example, the Root node shown in FIG. 9A may compute the overall path ETX for path P1 by summing or otherwise aggregating the ETX metrics for each of the constituent links 105a-105d along path P1.

Further mechanisms that can be used to quantify the packet error rate for a path may entail retrieving the bit error rate (BER) for each link along the path. For example, out of band and/or operations, administration, and maintenance (OAM) techniques can be used to obtain the BER for each link along a given path. In turn, the packet error rate for the path can be calculated by aggregating the BERs for each individual link along the path. For example, if a given path comprises n-number of links, $L_1$ to $L_n$, the packet error rate of the path may be computed as $1-[(1-(1-BER(L_1)^{P\_SIZE})* \ldots *(1-(1-BER(L_i)^{*P\_SIZE})* \ldots *(1-(1-BER(L_n))^{P\_SIZE})]$, which can easily be estimated knowing the statistical packet size distribution.

In response to receiving a packet, the DAG Root or other supervisory device may determine the path via which the packet was sent. For example, as shown in FIG. 9A, the Root node may perform a lookup of its routing information base (RIB), to determine that packet 902 was sent via path P1. In turn, the Root node may compute the estimated path packet error rate for the path and compare it to the actual/observed packet error rate for the path. In some embodiments, the observed end to end packet error rate can be estimated using, e.g., Deep Packet Inspection (DPI) on the received packet and performing a hash on the packet itself should the packet use the User Datagram Protocol (UDP) as the transport protocol or based on the Transmission Control Protocol (TCP) window, if TCP is used.

Figure 9B:
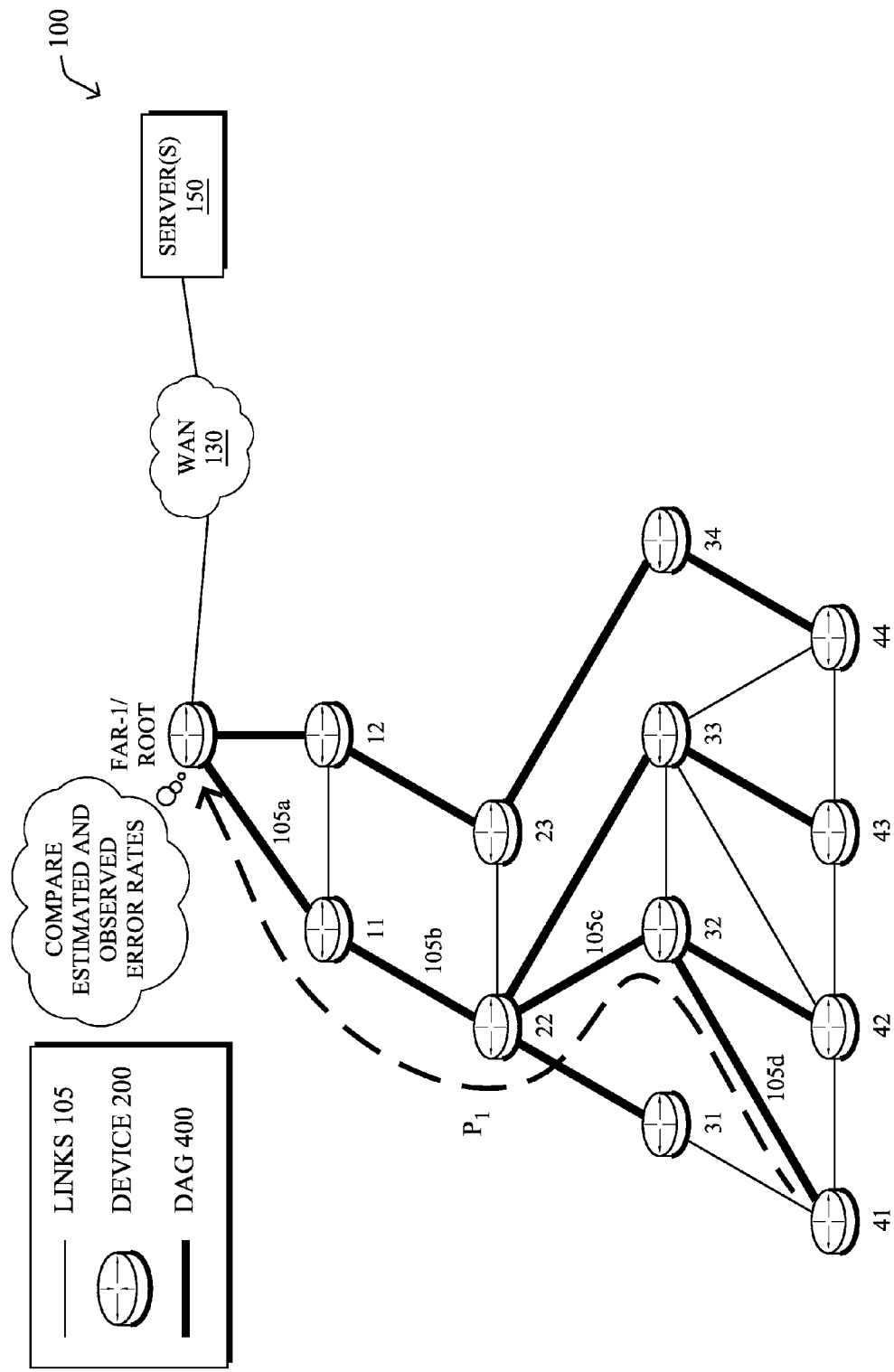

As shown in FIG. 9B, the Root node or other supervisory device may compare the estimated and observed packet error rates for a given path, to determine whether there is a discrepancy between these two metrics. For example, if $P_i$ is the $i^{th}$ path in the network, let $O\_PER(P_i)$ and $E\_PER(P_i)$ represent the observed and estimated packet error rates for path $P_i$, respectively. In various embodiments, the supervisory device may store each of these values locally for each path in the network, potentially in a compressed form.

One objective of the supervisory device may be to identify the set of one or more nodes along a given network path as potential sources of packet drops. For example, assume that node 32 along path $P_1$ in FIG. 9B is experiencing a memory leak due to a software defect. Consequently, packets 902 sent along path $P_1$ may experience greater packet error than would be otherwise expected along the path.

In one embodiment, the supervisory device may determine that a given path in the network includes at least one node that is a source of packet drops based on a comparison between the observed and expected packet error rates for the path. For example, for a given path $P_i$, the supervisory device may compare $O\_PER(P_i)$ and $E\_PER(P_i)$ periodically, in response to receiving a packet sent via the path, or at any other time. In turn, if the device determines that the observed and expected packet error rates differ significantly, the device may perform further analysis of the path, to identify the misbehaving node along the path. The device may use any number of different techniques to determine whether the difference between the expected and observed packet error rates for the path is considered significant. For example, the device may use statistical analysis, machine learning (e.g., k-means clustering to detect outliers, etc.), a defined threshold (e.g., based on the amount or percentage difference, etc.), or the like, to determine whether the expected and observed path packet error rates differ significantly.

Figure 9C:
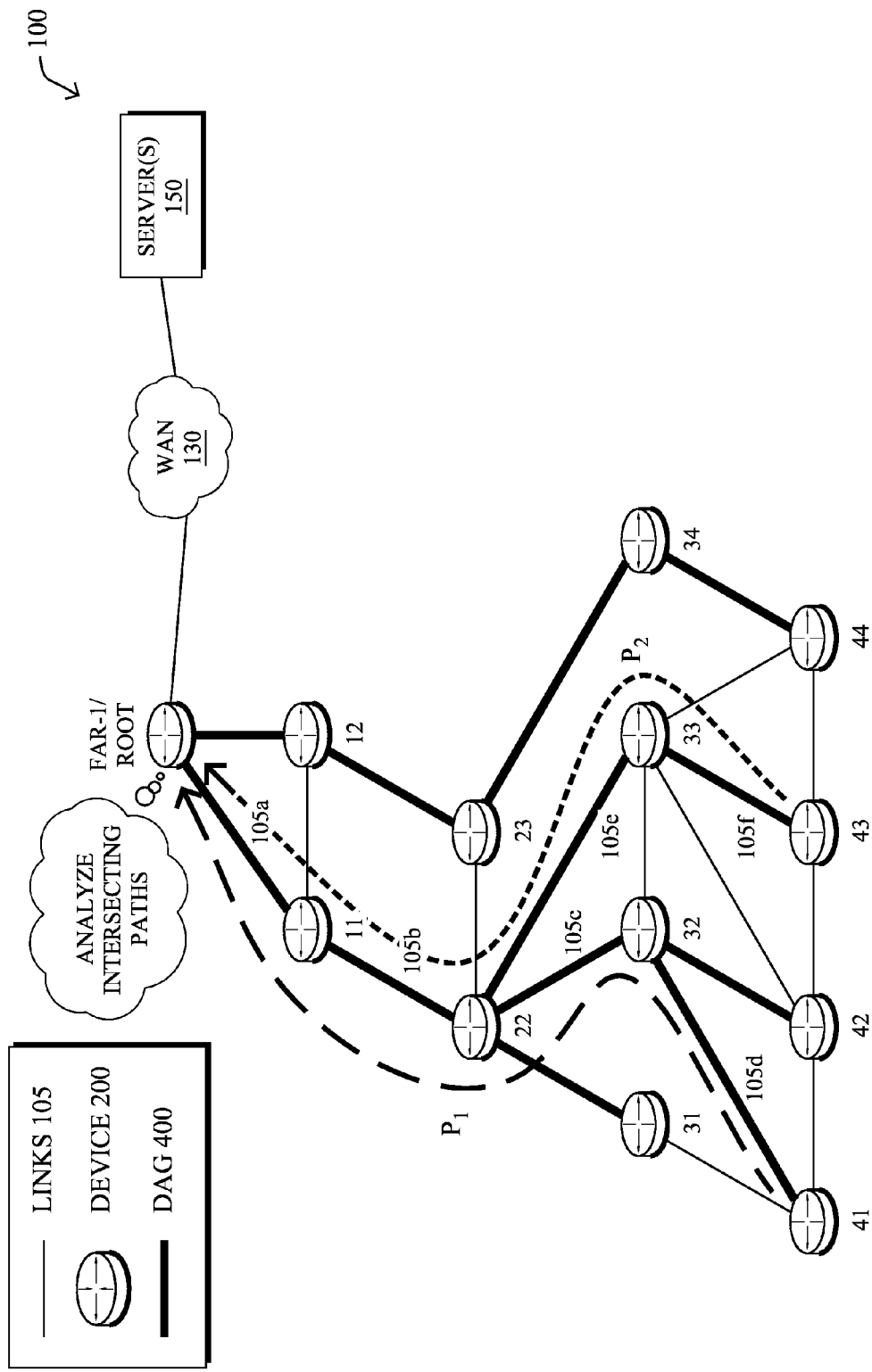

If the supervisory device determines that a path is exhibiting greater packet error than expected, the device may then attempt to identify the specific node along the path that is the source of the packet drops. In one embodiment, the device may begin this identification by identifying the other network paths that intersect the path of interest. For example, as shown in FIG. 9C, path P2 intersects path P1 along links 105a and 105b. For each of the links along the path of interest $P_1$, the supervisory device may identify those other paths in the network that also use the link.

Once the intersecting paths have been identified, the supervisory device may analyze the behaviors exhibited by these paths. In particular, the supervisory device may compare the expected and observed packet error rates for the intersecting paths, to determine which of the intersecting paths are also exhibiting unexpected behavior.

Figure 9D:
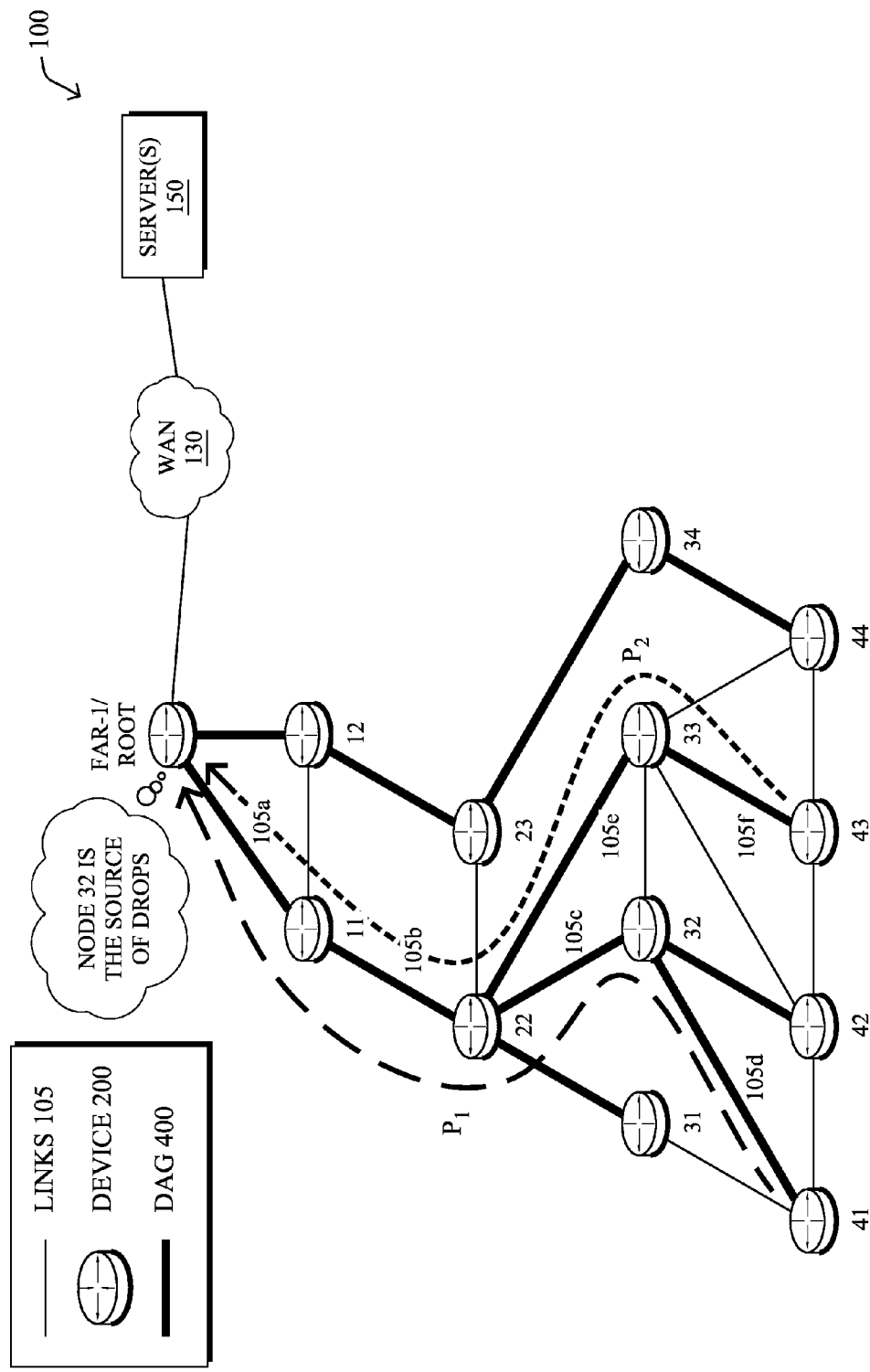

In various embodiments, the supervisory device may identify the node that is the source of packet drops along the path of interest based on the behaviors of the intersecting paths that intersect the path of interest. In particular, if a path $P_j$ that intersects path $P_i$ is found such that $O\_PER(P_j)$ and $E\_PER(P_j)$ are similar, then all nodes in the path $P_j$ can be excluded from the set of candidate nodes in $P_i$. For example, as shown in FIG. 9D, assume that the Root node determines that path $P_2$ that intersects path $P_1$ has an observed packet error rate that is close to that of its expected packet error rate. In such a case, the Root node may eliminate nodes 11 and 22 as potential sources of the packet drops along path $P_1$, leaving node 32 as the sole candidate as the source of the packet drops. In other words, the supervisory device may perform segment subtraction from the path of interest, to identify the node responsible for the packet drops.

In some cases, the supervisory device may not have enough information to definitively pinpoint the source of the packet drops. For example, the candidate list of nodes for the source of the packet drops may be greater than one after analyzing any of the existing intersecting paths, if the supervisory device does not have enough sets of observed and expected packet error rates to eliminate all but one candidate node. For example, the routing topology may be such that there are not enough intersecting paths to eliminate all but the source of the packet drops. In further cases, information regarding the observed packet error rate for an intersecting path may be stale (e.g., a particular node may only send traffic at relatively long, periodic intervals, etc.).

Figure 10:
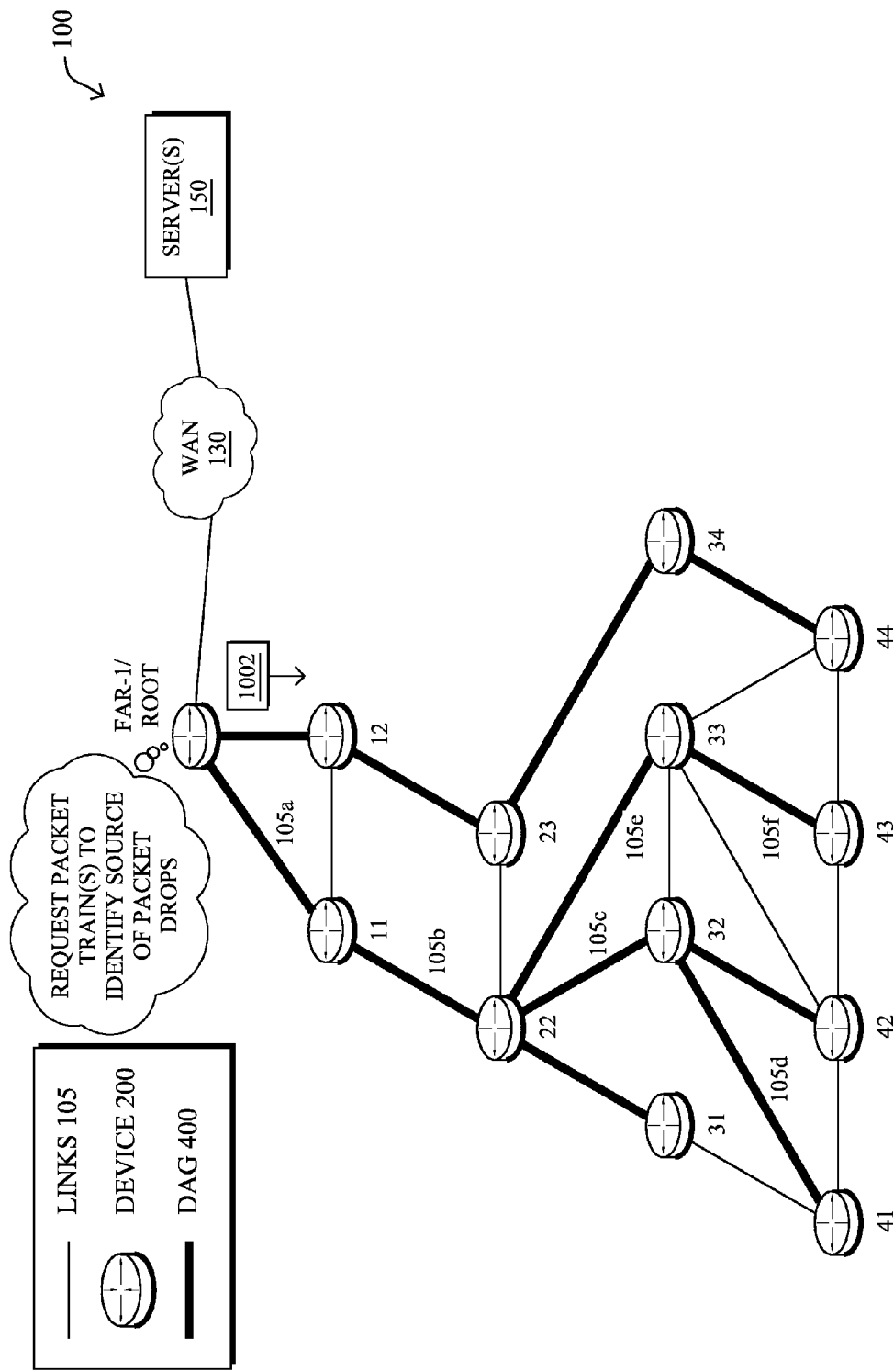
FIG. 10 illustrates an example of a network device requesting a packet train for observance.

If the supervisory device does not have enough information to pinpoint the source of packet drops in a path of interest, the device may request packet trains from one or more nodes in the network, so that the needed information can be collected. For example, as shown in FIG. 10, the Root node may send an instruction/request 1002 to one or more nodes in the network that requests the one or more nodes send packets along a path that intersects the path of interest. In some embodiments, request 1002 may be a custom IPv6 unicast message sent by the Root node, NMS (e.g., one of servers 150), or any other supervisory device, to the source of the shortest segment for which traffic is needed. In another embodiment, the requester may send request 1002 as a custom multicast IPv6 request to all nodes. In some cases, such a multicast message may request that all receiving nodes send packet trains using the same packet size, at least for each batch, and may further include timing information to stagger the sending of the packet trains over time, to avoid any network congestion.

In various embodiments, a packet train instruction/request may be sent in the absence of traffic (e.g., at a specific period of time), in response to detecting a potential defect (e.g., a path that deviates from its expected packet error rate, etc.), or at any other time. The request may also specify any or all of the following: a time at which the packets are to be sent, a priority for the packets (e.g., DSCP, etc.), a packet size (e.g., to match the size of user packets of the other paths, etc.) or any other parameter that controls when and how the packet trains are to be sent.

Based on a comparison between the observed and expected packet error rates for the intersecting paths being tested with packet trains, the supervisory device may continue to eliminate nodes along the path of interest as candidate sources of the packet drops along the path of interest. This process may continue until the specific source of the packet drops is identified. Once the supervisory device has identified the source of the packet drops, it may initiate any number of corrective measures.

Figure 11A:
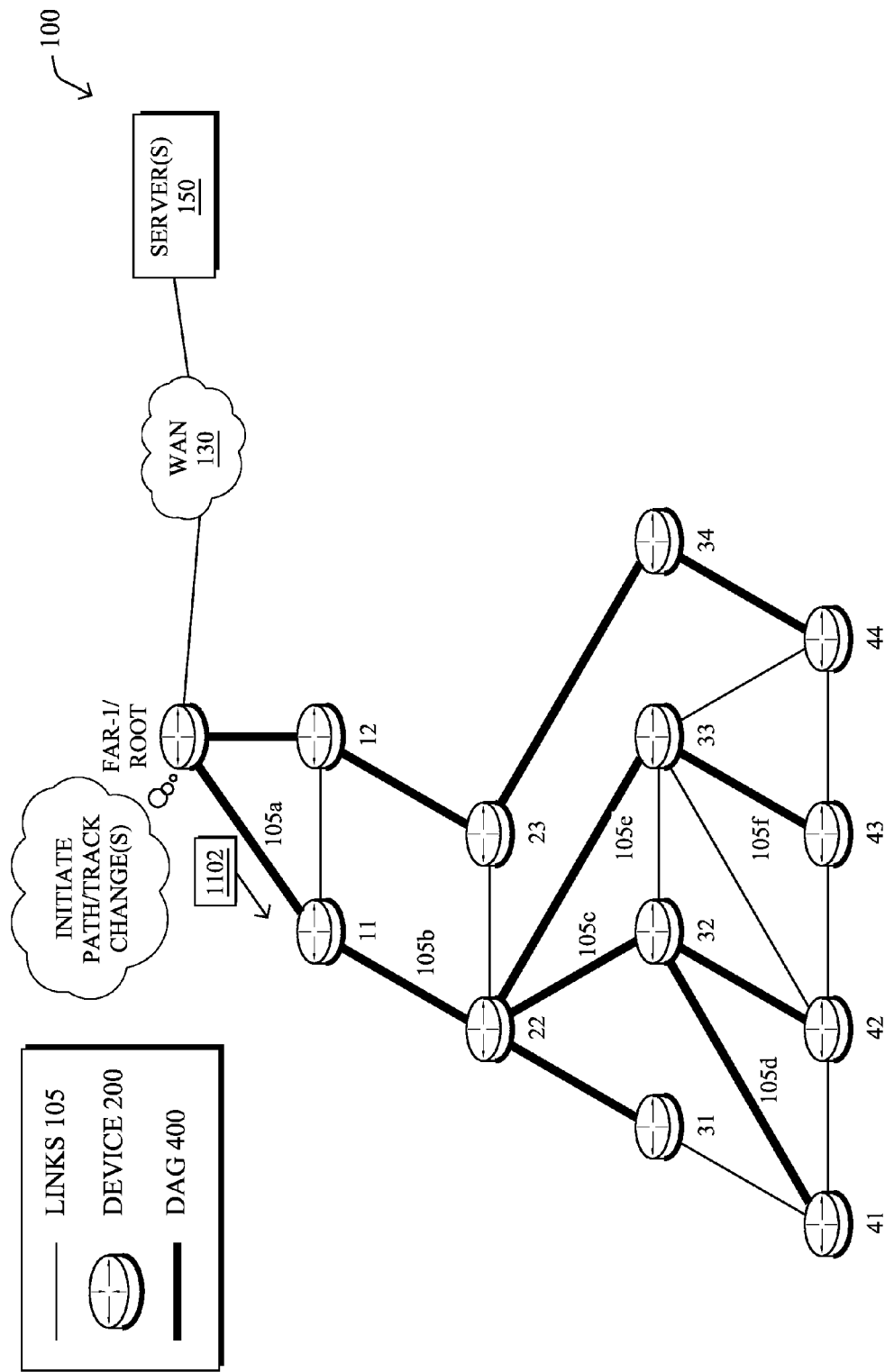
FIGS. 11A-11B illustrate examples of a network device causing a change in the network based on an identified source of packet drops.

In some embodiments, the supervisory device, or another device operating in conjunction therewith, may initiate a path change in the network, in response to identifying a source of packet drops. In one embodiment, the DAG Root or PCE in a 6TiSCH network may attempt to determine whether any alternate paths are available in the network. For example, as shown in FIG. 11A, the Root node may provide an instruction 1102 that causes a change to DAG 400 and, more specifically, to the path experiencing packet loss. In response, node 41 may select node 31 as its parent in the updated DAG 400a, thereby avoiding node 32, which was identified as the source of packet drops.

Figure 11B:
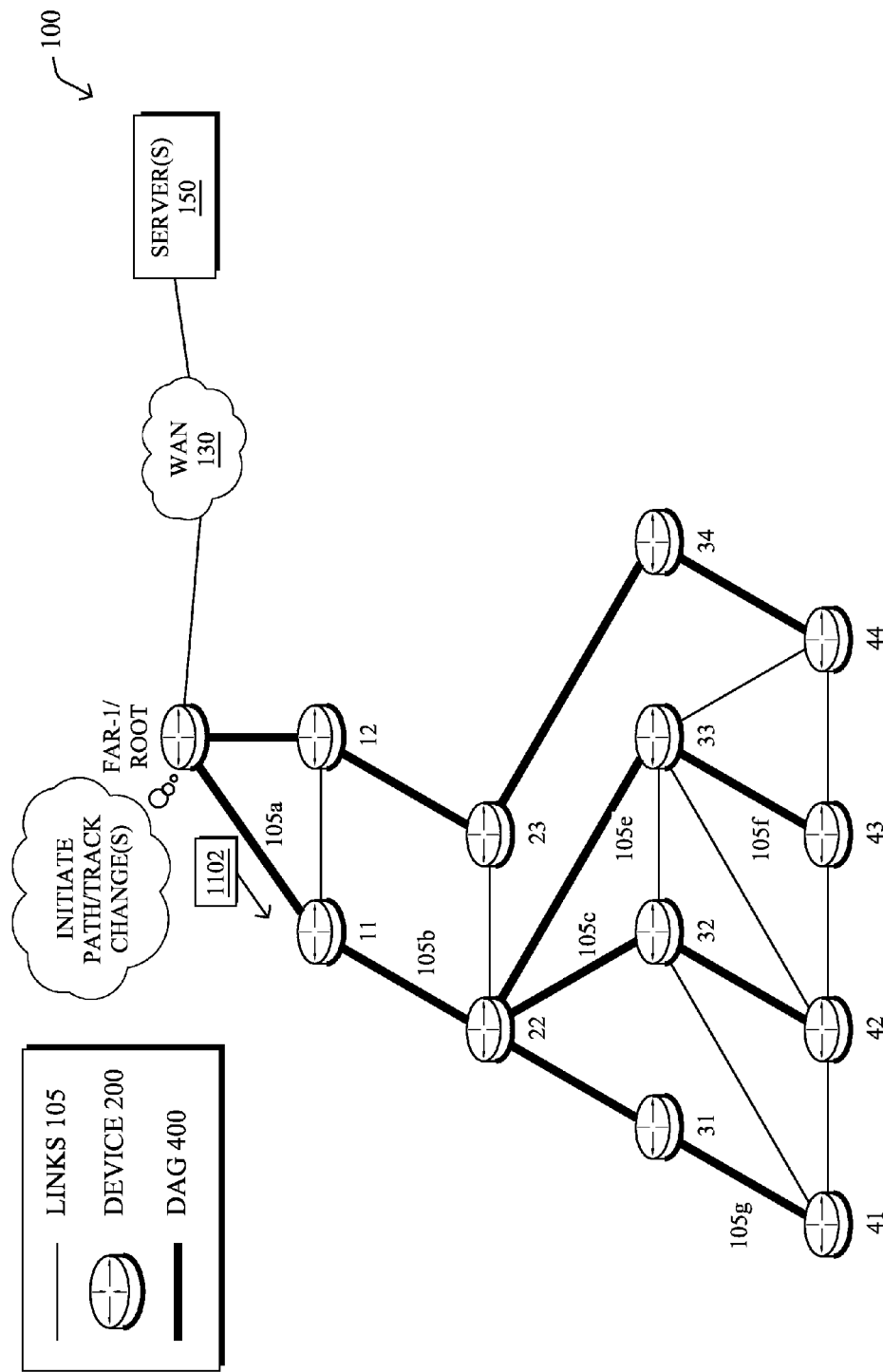

In the case of a RPL DAG, the Root node may attempt to identify alternate paths and, if they exist, provide reasonable alternate route(s) to the affected nodes. For example, the Root may analyze historical data regarding the network and previously advertised parent lists, to identify any alternative routes. To then effect the routing change, the Root may request that the anomalous node signal a high path cost in its DIO message. For example, assume that instruction 1102 requests that anomalous node 32 report a high path cost to its neighbors. Consequently, the neighboring nodes (e.g., node 41, etc.) will select other nodes as their respective parents, resulting in anomalous node 32 become a leaf in the updated mesh, as shown in FIG. 11B.

In the case of a 6TiSCH network, the PCE (e.g., in servers 150) may take a similar approach and compute alternate tracks, in response to identifying a particular node as the source of packet drops. Such a computation may take into account, e.g., the tradeoff between more reliable paths and increased path costs. In some cases, the PCE may also take into account the specific service level agreements (SLAs) associated with the affected traffic. In another embodiment, the supervisory device may determine whether there is a correlation between packet sizes and packet drops at the anomalous node. If so, the supervisory device may request that the originators of the traffic continue to route traffic through the source of the packet drops, but using a shorter maximum transmission unit (MTU), to help alleviate the drops.

As noted, the supervisory device may cause multiple paths to be rerouted, in response to detecting a potential node error. However, in some cases, doing so may result in too much traffic being rerouted (e.g., due to an excess of traffic, the failure point is on one or more a subset of the paths, etc.). In one embodiment, the supervisory device may restore one or more of the rerouted paths (e.g., in a predetermined order) and observe whether restoring an individual path causes any issues. In doing so, the supervisory device may track the problem down to the individual route or set of routes that are behaving abnormally.

Figure 12:
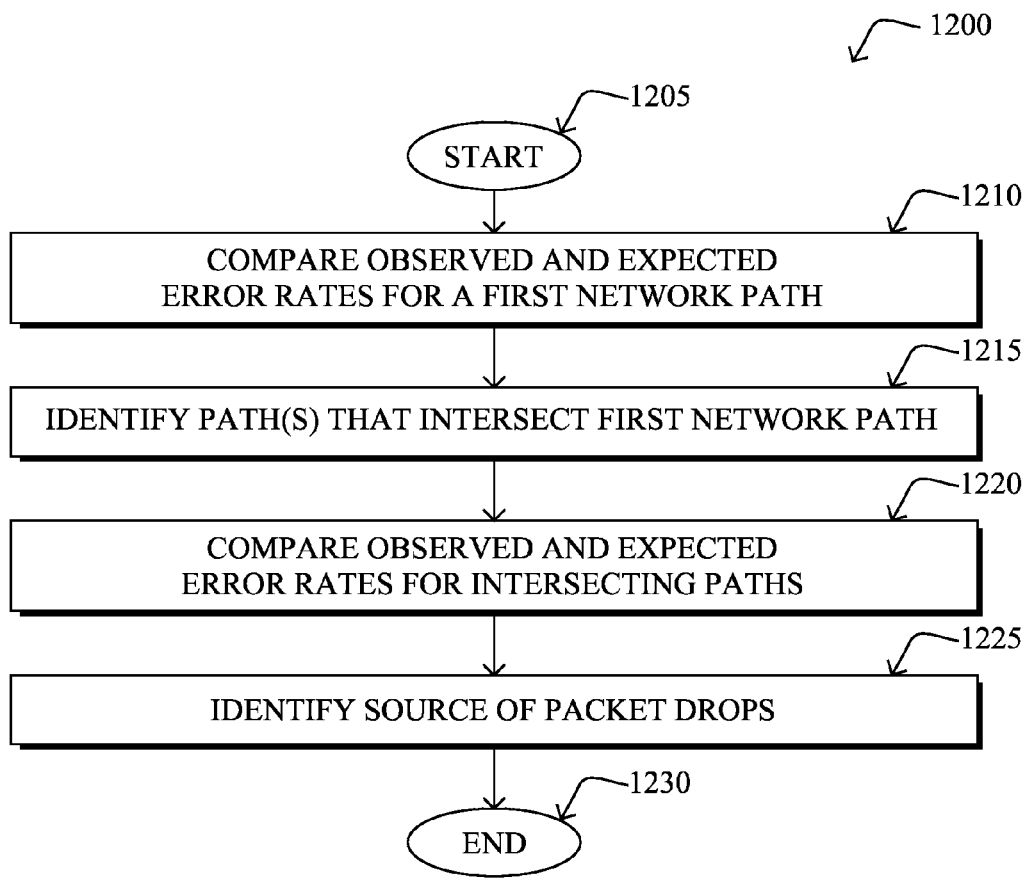
FIG. 12 illustrates an example simplified procedure for identifying a source of packet drops in a network.

FIG. 12 illustrates an example simplified procedure for identifying a source of packet drops in a network, in accordance with one or more embodiments described herein. The procedure 1200 may start at step 1205 and continue on to step 1210 where, as described in greater detail above, a device in a network may compare observed and expected packet error rates for a first network path. In particular, the device may first quantify the expected packet error rate across all of the respective links of the first path. Then, in turn, the device may determine the actual error rate and compare the two rates, to determine whether the rates differ significantly. For example, the device may perform DPI on packets sent via the first path to determine the observed packet error rate, and then compare this rate to the expected rate for the path. In some embodiments, the device may use a machine learning process to determine whether any differences between the observed and expected error rates are significant and warrant further action.

At step 1215, the device may identify one or more other paths that intersect the first network path, as detailed above. In various embodiments, an intersecting path may be any network path that shares at least one node/link with that of the first path. For example, the device may use information stored in its RIB to determine that a particular packet was sent via the first path and then use the information in its RIB to identify any other paths in the network that intersect the first path.

At step 1220, as described in greater detail above, the device may compare observed and expected packet error rates for the one or more identified intersecting paths. In some cases, the device may perform a similar analysis as in step 1210, to determine whether any of the intersecting paths are also exhibiting anomalous behavior. In various embodiments, the device may request that one or more nodes along the intersecting path(s) send packet trains along the path(s), to facilitate this determination. Such a request may, for example, include an instruction that identifies at least one of: a time at which the packets should be sent, a priority, or a packet size for the packets. Further, the device may instruct any or all nodes to send the packet trains (e.g., by multicasting the instruction to the nodes, etc.).

At step 1225, as detailed above, the device may identify a particular node along the first path as a source of packet drops based on the comparisons performed in steps 1210 and 1220. Notably, if the device determines that the behavior of the first path is anomalous, the device may also analyze the behaviors of any paths that intersect that of the first path. Any nodes/links that are shared between the first path and an intersecting link that is behaving as expected can then be eliminated as candidates for the source of the packet drops along the first path. Said differently, the device may analyze the behaviors of the intersecting paths, to identify the source of drops along the first path by process of elimination. Once identified, the device may then take any number of different measures such as providing an alert (e.g., to a network administrator, etc.), initiating a routing or track change in the network to avoid the misbehaving node, instruct a node to continue to route certain traffic via the misbehaving node (e.g., using a shorter MTU, etc.), or the like. Procedure 1200 then ends at step 1230.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to identify software defects present that the node level, which is otherwise not possible using existing techniques such as Constrained Application Protocol (CoAP) probing. Further, the techniques herein propose various actions that can be taken proactively to mitigate the effects of a defective node, such as shifting traffic to a more reliable path.

While there have been shown and described illustrative embodiments that provide for the detection of a source of packet drops in a network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, such as RPL and 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
obtaining, by a device in a network, observed and expected packet error rates for a first path in the network;
performing, by the device, a first comparison between the observed and expected packet error rates for the first path in the network;
identifying, by the device, one or more intersecting paths in the network that intersect the first path, wherein an intersecting path is a network path that shares at least one node or link with first path;

obtaining, by the device, observed and expected error rates for the interesting paths that intersect the first path;

performing, by the device, one or more additional comparisons between observed and expected packet error rates for the intersecting paths that intersect the first path; and identifying, by the device, a particular node along the first path as a source of packet drops by process elimination based on the first comparison between the observed and expected packet error rates for the first path and on the one or more additional comparisons between the observed and expected packet error rates for the intersecting paths that intersect the first path, wherein the device analyzes behaviors of the intersecting paths to identify the particular node through process of elimination.

2. The method as in claim 1, wherein performing the first comparison between the observed and expected packet error rates for the first path comprises:

determining that a set of packets were communicated via the first path; and analyzing the set of packet to determine the observed packet error rate for the first path.

3. The method as in claim 2, wherein performing the first comparison between the observed and expected packet error rates for the first path further comprises:

calculating the expected packet error rate for the first path using link metrics for links along the first path.

4. The method as in claim 1, further comprising:

in response to device not having enough information to identify the source of packet drops:

causing, by the device, one or more nodes along the one or more intersecting paths that intersect the first path to send packets along the one or more intersecting paths for observation; and determining, by the device, the observed packet error rates for the one or more intersecting paths by analyzing the packets sent along the one or more intersecting paths.

5. The method as in claim 4, wherein causing the one or more nodes along the one or more intersecting paths to send packets along the one or more intersecting paths for observation comprises:

sending an instruction to the one or more nodes to send the packets along the one or more intersecting paths for observation, wherein the instruction specifies one or more of: a time at which the packets should be sent, a priority, or a packet size for the packets.

6. The method as in claim 4, wherein causing the one or more nodes along the one or more intersecting paths to send packets along the one or more intersecting paths for observation comprises:

sending a multicast instruction to all nodes along the intersecting path to send the packets along the one or more intersecting paths for observation.

7. The method as in claim 4, wherein the device causes the one or more nodes along the one or more intersecting paths to send the packets along the one or more intersecting paths for observation, in response to determining that the source of the packet drops along the first path cannot be identified from existing traffic in the network.

8. The method as in claim 1, wherein performing the first comparison between observed and expected packet error rates for the first path in the network comprises:

using, by the device, a machine learning process to determine whether a discrepancy exists between the observed and expected packet error rates for the first path.

9. The method as in claim 1, further comprising:

causing, by the device, a change to the first path in the network based on the identified source of the packet drops.

10. The method as in claim 1, further comprising:

performing, by the device, an analysis of performance requirements associated with traffic sent along the first path; and causing, by the device, at least a portion of the traffic sent along the first path to be routed via the identified source of the packet drops based on the analysis of the performance requirements associated with the traffic.

11. The method as in claim 1, further comprising:

causing, by the device, the node identified as the source of the packet drops to become a leaf in a routing topology used in the network.

12. The method as in claim 1, further comprising:

causing, by the device, a source of traffic sent via the first path to send packets according to a different 6TiSCH track, wherein 6TiSCH track represents a given path in the network.

13. An apparatus, comprising:

one or more network interfaces to communicate with a network;

a processor coupled to the network interfaces and adapted to execute one or more processes; and a memory configured to store a process executable by the processor, the process when executed configured to:

obtain observed and expected packet error rates for a first path in the network;

perform a first comparison between the observed and expected packet error rates for the first path in the network;

identify one or more intersecting paths in the network that intersect the first path, wherein an intersecting path is a network path that shares at least one node or link with first path;

obtain observed and expected error rates for the interesting paths that intersect the first path;

perform one or more additional comparisons between observed and expected packet error rates for the intersecting paths that intersect the first path; and identify a particular node along the first path as a source of packet drops by process elimination based on the first comparison between the observed and expected packet error rates for the first path and on the one or more additional comparisons between the observed and expected packet error rates for the intersecting paths that intersect the first path, wherein the device analyzes behaviors of the intersecting paths to identify the particular node through process of elimination.

14. The apparatus as in claim 13, wherein the apparatus performs the first comparison between the observed and expected packet error rates for the first path by:

determining that a set of packets were communicated via the first path; and analyzing the set of packet to determine the observed packet error rate for the first path.

15. The apparatus as in claim 14, wherein the apparatus performs the first comparison between the observed and expected packet error rates for the first path further by:

calculating the expected packet error rate for the first path using link metrics for links along the first path.

16. The apparatus as in claim 13, wherein the process when executed is further configured to:
in response to device not having enough information to identify the source of packet drops:
cause one or more nodes along the one or more intersecting paths that intersect the first path to send packets along the one or more intersecting paths for observation; and
determine the observed packet error rates for the one or more intersecting paths by analyzing the packets sent along the one or more intersecting paths.

17. The apparatus as in claim 16, wherein the apparatus causes the one or more nodes along the one or more intersecting paths to send packets along the one or more intersecting paths for observation by:
sending an instruction to the one or more nodes to send the packets along the one or more intersecting paths for observation, wherein the instruction specifies one or more of: a time at which the packets should be sent, a priority, or a packet size for the packets.

18. The apparatus as in claim 16, wherein the apparatus causes the one or more nodes along the one or more intersecting paths to send the packets along the one or more intersecting paths for observation, in response to determining that the source of the packet drops along the first path cannot be identified from existing traffic in the network.

19. The apparatus as in claim 13, wherein the process when executed is further configured to:
perform analysis of performance requirements associated with traffic sent along the first path; and
cause at least a portion of the traffic sent along the first path to be routed via the identified source of the packet drops based on the analysis of the performance requirements associated with the traffic.

20. A tangible, non-transitory, computer-readable media having software encoded thereon, the software when executed by a processor configured to:
obtain observed and expected packet error rates for a first path in the network;
perform a first comparison between the observed and expected packet error rates for the first path in the network;
identify one or more intersecting paths in the network that intersect the first path, wherein an intersecting path is a network path that shares at least one node or link with first path;
obtain observed and expected error rates for the interesting paths that intersect the first path;
perform one or more additional comparisons between observed and expected packet error rates for the intersecting paths that intersect the first path; and
identify a particular node along the first path as a source of packet drops by process elimination based on the first comparison between the observed and expected packet error rates for the first path and on the one or more additional comparisons between the observed and expected packet error rates for the intersecting paths that intersect the first path, wherein the device analyzes behaviors of the intersecting paths to identify the particular node through process of elimination.

* * * * *